June 14, 1927.
J. F. MacKAY
1,632,239
EGG TRAY FOR INCUBATORS
Filed March 1, 1924
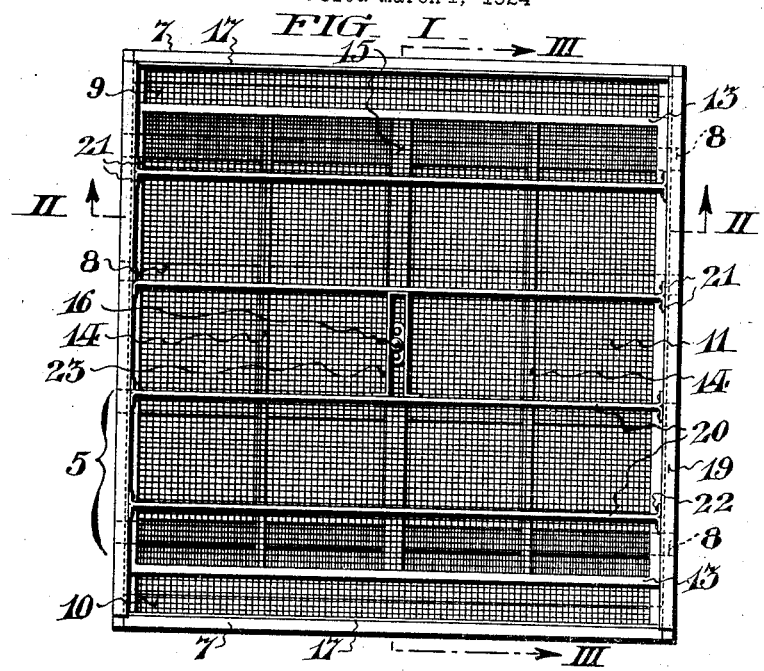
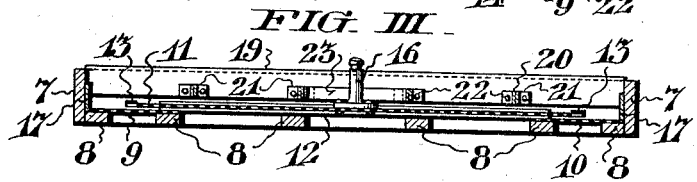
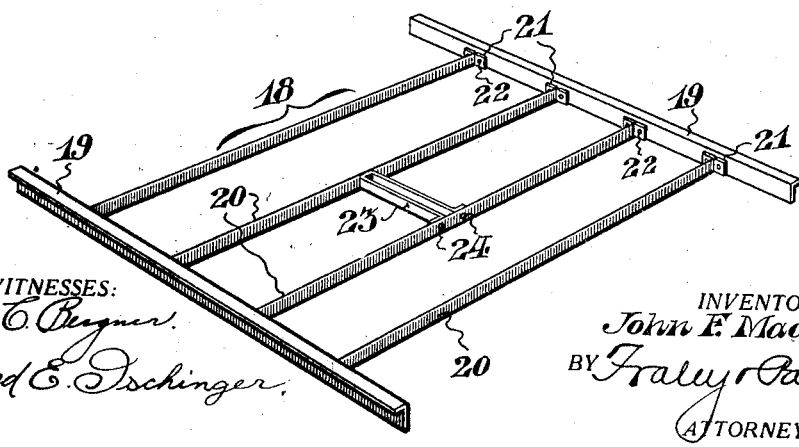
WITNESSES:
John C. Bugner
Alfred E. Dschinger
INVENTOR:
John F. MacKay,
BY Fraley & Paul
ATTORNEYS.

Patented June 14, 1927.

1,632,239

UNITED STATES PATENT OFFICE.

JOHN F. MacKAY, OF LANCASTER, PENNSYLVANIA.

EGG TRAY FOR INCUBATORS.

Application filed March 1, 1924. Serial No. 696,122.

This invention relates to incubators and it has more particular reference to egg trays of the type comprising a frame and bottom sections, some of the latter being stationary and others relatively movable, the primary object being to provide an improved form of tray whereby the eggs may be uniformly turned as often as required.

Another object is to provide an egg tray having relatively slidable bottom sections provided with upset flanges to prevent shells falling into the nursery trays during hatching.

A further object is to arrange the egg turning means as a unit assemblage adapted to seat on the egg tray walls.

With the foregoing and other objects in view, my invention consists in certain novel features of construction, combinations and arrangements of parts hereinafter described, and more specifically defined by the subjoined claims.

In the further disclosure of this invention reference will be had to the accompanying sheet of drawings, constituting a part of this specification, and illustrative of one practical embodiment of said invention.

Fig. I is a top plan view of my novel egg tray.

Fig. II is a transverse section taken substantially on the line II—II in the preceding figure.

Fig. III is a similar section taken on the line III—III in Fig. I; and,

Fig. IV is a perspective view of the egg turning means removed from the tray.

Referring more in detail to the drawings I construct a frame 5,—preferably rectangular—of wood and comprising side walls 6, 6 7, 7 appropriately braced by horizontal rails 8, 8 which are rabbeted at their ends into said side walls. These rails 8, 8 serve to support the tray bottom which is made in three sections 9, 10, 11, two of which—9, 10—are slidable or telescopic relative to the third section 11. In order to facilitate smooth sliding movement of the section 11, I fit opposed walls 6, 6—for example—with sheet metal angle strips 12, 12 that constitute supporting runners on which the section 11 rests. This section 11 which is relatively large is preferably made of wire-gauze, wire-mesh, or other reticulate material, suitably reinforced at the edges with fold over perimetrical forming strips 13, and one or more cross-braces 14, with a medial bar 15 to which is riveted or otherwise secured the shifter pin 16.

The aforesaid sections 9, 10 as will be best seen from Figs. I and III are considerably smaller than the section 11, but are made of like material with an upset flange 17, running longitudinally along one edge for a purpose later on explained. It is also noteworthy that these bottom sections 9, 10 are collapsible relative to the main bottom section 11, and to that end I mount them for sliding movement upon adjacent rails 8, 8 below the hereinbefore referred to angle strips 12, the lateral flanges whereof function as guides for said sections 9, 10 while effectively preventing their accidental dislodgment. Obviously these sections 9, 10 may be otherwise supported for sliding movement relative to the section 11, but it is to be particularly observed that the upset flanges 17, 17 limit the extent to which said sections may be collapsed, as well as affording means effective to prevent egg shells from falling-off, or through, the tray during the hatching periods.

The movable bottom section 11 is operated by any appropriate means connected to the shifter pin 16, such means not being shown as it constitutes no essential part of my present invention, and will be well understood by those conversant with the art to which this invention appertains. The turning of the eggs at proper periods is essential to expose all sides to the heat and otherwise regulate incubation, and to better effect such turning action it is necessary to have obstacles against which the eggs may contact when the bottom section 11 slides. According to my present invention I employ the means or device comprehensively designated by the numeral 18 and best illustrated in Fig. IV, the same comprising spaced and opposed sheet metal angle pieces 19, 19 connected by flat partitions or bars 20, 20, conveniently made of retroverted sheet metal, split at the ends to afford lateral flanges 21, by means of which said partitions or bars are secured in spaced relation by rivets or the like 22 to the aforesaid angle pieces 19, 19. Thus it will be readily seen that the device 18 can be readily placed in position in the frame or tray 5, and removed therefrom as a unit for purposes of cleaning and so forth. Still further it is to be noted that when the device 18 is in place the partitions or bars 20 are somewhat above the bottom movable section 11 as best seen in Figs. II and III.

Intermediate the inner partitions or bars 20, 20 I fit a substantially U-shaped strap 23 functional as a brace and guide for limiting movement of the bottom section 11, said guide being conveniently secured in place by rivets or the like 24.

From the foregoing it will be clearly understood that by manipulation of the shifter pin 16 the movable bottom section 11 can be adjusted in position so as to turn the eggs as may be required at intervals during the incubation period, since the movement of said section presses the eggs against each other and against the partitions or bars 20 and the sides of the tray 5, and causes the eggs, therefore, to roll over and change their position. Furthermore, it will be readily appreciated that during the hatching periods either or both of the bottom sections 9, 10 may be slid beneath the main bottom section 11 with the upset flange 17 in abutment with the edge of said section, thereby affording egress for the hatched chicks to the nursery trays while effectively preventing any broken shell from falling off the bottom 11.

Although I have specifically described one convenient and preferred embodiment of this invention it is to be understood that I do not limit myself to the precise details disclosed as changes may be made without departing from the spirit or exceeding the scope of said invention as succinctly defined by the subjoined claims.

Furthermore, it will be self evident that an egg tray constructed in accordance with this invention can be easily disassembled for purposes of cleaning, and just as promptly re-assembled without any possibility of damage by an inexperienced person, while the tray as a whole comprises the minimum number of parts which are all of a serviceable and durable character, easy to manufacture and convenient to put together.

Having thus described my invention, I claim:

1. An egg tray for incubators comprising a frame, a recticulate bottom for supporting the eggs, means for moving said bottom to effect the necessary egg turning, and relatively narrow slidable means for preventing egg shells falling off the tray during the hatching period.

2. An egg tray for incubators comprising a frame, relatively movable foraminous bottom sections mounted therein, one of which is adapted for supporting and turning the eggs, and the others functioning to prevent egg shells from falling through the tray during the hatching period.

3. An egg tray for incubators comprising a frame, a movable intermediate and opposed relatively slidable narrow perforate bottom sections mounted therein, said intermediate section serving to support and effect the necessary turning of the eggs, and the opposed narrow sections when moved relative thereto functioning to prevent shells from falling through the tray during the hatching period.

4. An egg tray for incubators comprising a frame, an intermediate movable perforate bottom section of substantial area mounted therein, opposed similar smaller sections adapted to slide below said intermediate section provided with movement limiting means affording protection against shells falling through the tray during the hatching period.

5. An egg tray for incubators comprising a main frame, an intermediate perforate bottom section of large area movable therein, opposed similar smaller sections slidable thereunder, each of said smaller sections having a longitudinal upset movement limiting flange adapted to afford protection against shells falling through the tray during the hatching period.

6. An egg tray for incubators comprising a frame, a reticulate main bottom for supporting the eggs, means for moving said bottom to effect the necessary egg turning, and relatively narrow slidable bottom sections for preventing egg shells falling off the tray during the hatching period, in combination with a stationary framework of parallel bars for aiding turning of the eggs in aligning relation while incubating.

7. An egg tray for incubators comprising a frame, relatively movable and slidable foraminous bottom sections mounted therein, one of which is adapted for supporting the eggs, and the others functioning to prevent egg shells from falling through the tray during the hatching period, in combination with a stationary framework of rigidly supported spaced obstacles effective to turn the eggs in aligning relation while incubating.

8. An egg tray for incubators comprising a frame, relatively movable intermediate and opposed slidable perforate bottom sections mounted therein, said intermediate section serving to support the eggs, and the opposed sections when moved relative thereto functioning to prevent shells from falling through the tray during the hatching period, in combination with a stationary frame work including spaced rails effective to turn the eggs in aligning relation while incubating.

9. An egg tray for incubators comprising a frame, an intermediate movable perforate bottom section of substantial area mounted therein, opposed similar smaller sections adapted to slide below said intermediate section provided with movement limiting means affording protection against shells falling through the tray during the hatching period, in combination with a frame work consisting of opposed supporting members adapted to seat in the tray frame, and a series of parallel bars rigidly secured between said supporting members for effecting egg turning during incubation.

10. An egg tray for incubators comprising a main frame, an intermediate perforate bottom section of large area movable therein, opposed similar smaller sections slidable thereunder, each of said smaller sections having a longitudinal upset movement limiting flange adapted to afford protection against shells falling through the tray during the hatching period, in combination with a frame work consisting of opposed inverted L-shaped members adapted to seat in the tray frame, and a series of parallel bars rigidly secured at right angles between said supporting members for effecting egg turning during incubation.

11. An egg tray for incubators comprising a main frame, an intermediate perforate bottom section of large area movable therein, opposed similar smaller sections slidable thereunder, each of said smaller sections having a longitudinal upset movement limiting flange adapted to afford protection against shells falling through the tray during the hatching period, in combination with a frame work consisting of opposed inverted L-shaped members adapted to seat in the tray frame, a series of parallel bars rigidly secured at right angles between said supporting members for effecting egg turning during incubation, and means associated with an intermediate pair of the parallel bars for limiting the movement of the aforesaid large bottom section.

In testimony whereof, I have hereunto signed my name at Philadelphia, Pennsylvania, this 25th day of February, 1924.

JOHN F. MacKAY.